United States Patent [19]

Grime

[11] Patent Number: 4,655,693
[45] Date of Patent: Apr. 7, 1987

[54] COMPRESSOR APPARATUS

[75] Inventor: Thomas E. Grime, Temperance, Mich.

[73] Assignee: Champion Spark Plug Company, Toledo, Ohio

[21] Appl. No.: 201,517

[22] Filed: Oct. 27, 1980

[51] Int. Cl.$^4$ .............................................. F04B 49/00
[52] U.S. Cl. ................................... 417/212; 417/362; 474/26
[58] Field of Search ...................... 417/15, 38, 362, 53, 417/212, 223; 474/17, 26, 8

[56] References Cited

U.S. PATENT DOCUMENTS

| | | | |
|---|---|---|---|
| 862,867 | 8/1907 | Eggleston | 417/390 |
| 1,159,554 | 11/1915 | Veley et al. | 417/362 X |
| 1,730,319 | 10/1929 | Dilks | 417/212 X |
| 2,289,287 | 7/1942 | Hallinan | 474/26 X |
| 2,448,379 | 8/1948 | Mantle | 417/15 |
| 2,961,147 | 11/1960 | Osterkamp | |
| 2,994,228 | 8/1961 | Osborne | 474/17 |
| 3,119,552 | 1/1964 | Thomann | |
| 3,132,596 | 5/1964 | Dinger | 417/212 |

FOREIGN PATENT DOCUMENTS 101783  8/1937  Australia .............................. 417/223

OTHER PUBLICATIONS

Dana Corporation brochure for "Gerbing Variable Speed Fan Drive".

Primary Examiner—Edward K. Look
Attorney, Agent, or Firm—Emch, Schaffer, Schaub & Porcello Co.

[57] ABSTRACT

A method and apparatus for controlling a motor is disclosed in this application. A means for loading the motor is provided and the loading means is operatively connected to the motor. A variable drive means is operatively connected between the motor and the drive means. The variable drive means is capable of changing the loading on the motor. A sensing means is provided for actuating the variable drive means so the loading on the motor can be varied to keep the motor operating at substantially the maximum capacity of the motor.

2 Claims, 6 Drawing Figures

COMPRESSOR APPARATUS

BACKGROUND OF THE INVENTION

The invention relates to a speed control device that can be used to vary the speed at which a motor operates. This invention is particularly useful for increasing or decreasing the speed of an air compressor for keeping the air compressor operating at or near its maximum capacity. In one of the more specific aspects of the present invention, the air compressor contains a variable drive means for increasing or decreasing the speed on the air compressor.

The application for the speed control device of the present invention can be appreciated by reviewing the prior art in the air compressor area. Air compressors are one application where the present invention can most advantageously be utilized. Most traditional air compressors contain a motor that is used to drive a compressor. The compressed air produced by the compressor is directed to an air reservoir where the compressed air is maintained until it is used. In most applications a constant speed electrical motor is used to drive the compressor. A belt or other suitable drive means is used to connect the motor and compressor. The constant speed motor will normally have a maximum amperage rating at which it can be safely operated.

When the compressor first begins to supply air to the air reservoir there is little or no pressure in the reservoir and the compressor can easily supply the compressed air to the reservoir. At this initial state there is very little loading on the motor that drives the compressor. As the pressure in the reservoir increases the motor and the compressor will have to work harder to supply additional air to the reservoir. This results because the air being supplied from the compressor will have to be at a higher pressure than the air in the reservoir for additional air to enter the reservoir. As the air pressure in the reservoir increases the motor and compressor will be forced to work harder to supply the higher pressure air to the reservoir. In most applications the motor is sized so that it is working at or near its maximum amperage rating when the compressor is supplying air to the reservoir at the maximum designed pressure for the compressor.

Over much of the operating range for the air compressor the constant speed electrical motor is working below its maximum designed rating. The motor is being under utilized except during the limited time that the compressor is supplying air at the maximum rated air pressure for the compressor. The under utilization of the motor on the air compressor reduces the efficiency and performance of the compressor.

Therefore, it would be desirable to have a speed control device for use with an air compressor where the motor that drives the compressor operates at or near its maximum rated amperage level throughout the operational cycle of the air compressor. By having the motor operating at its maximum rated capacity the compressor would be capable of producing greater volumes of lower pressure air and the compressor would reach its maximum rated air pressure more quickly.

SUMMARY OF THE INVENTION

According to the invention, there is provided motor control apparatus comprising a motor and means for loading the motor. The load means is spaced apart from the motor and operatively connected to the motor. A variable drive means is operatively connected between the motor and the load means. The variable drive means includes means for changing the loading on the motor. A sensing means is provided for actuating the variable drive means whereby the speed and the loading on the motor can be varied.

There is also provided an air compressor apparatus comprising motor means and a compressor spaced from the motor means. An air receiving container is provided for receiving air from the compressor. A variable drive means is operatively connected between the motor means and the compressor. The variable drive means includes means for increasing or decreasing the loading on the motor. A sensing means is provided for actuating the variable drive means.

According to the invention there is further provided a method for controlling the speed of a motor. The motor drives a load means. A variable drive means is operatively connected between the motor and the load means. The operating conditions of the motor are sensed during the operation of the motor. The variable drive means is activated in response to the operating condition of the motor to vary the speed and the loading on the motor.

There is also provided according to the invention a method for varying the load on the motor of an air compressor The motor drives a compressor to supply air under pressure to an air receiving container. The motor is movably mounted with respect to the compressor and a variable drive means is operatively connected between the motor and the compressor. The air pressure in the air receiving container is sensed by a monitoring means. The motor is moved with respect to the compressor in response to the air pressure in the air receiving container. As the motor moves the variable drive means changes the drive ratio between the motor and the compressor whereby the loading on the motor is varied.

It is an object of the invention to provide an improved means for controlling a motor.

It is an object of the invention to provide an improved air compressor apparatus.

It is also an object of the invention to provide an improved method of operating an air compressor.

It is a further object of the invention to provide an improved air compressor apparatus and method for operating the air compressor to maximize the output of the air compressor.

Other objects and advantages of the invention will become apparent as the invention is described hereinafter in detail and with reference to the accompanying drawings.

DESCRIPTION OF THE PREFERRED EMBODIMENTS

This invention relates to a motor control containing a variable drive means for increasing or decreasing the speed and the loading on the motor. The invention is particularly useful on air compressors. To facilitate the description of the invention; the invention will be described as used in connection with an air compressor. However, it should be understood that the invention can be used in other areas, such as, fan, pump and conveyor drives. Features of this invention will be more fully understood by referring to the attached drawings in connection with the following description.

Figure 1:
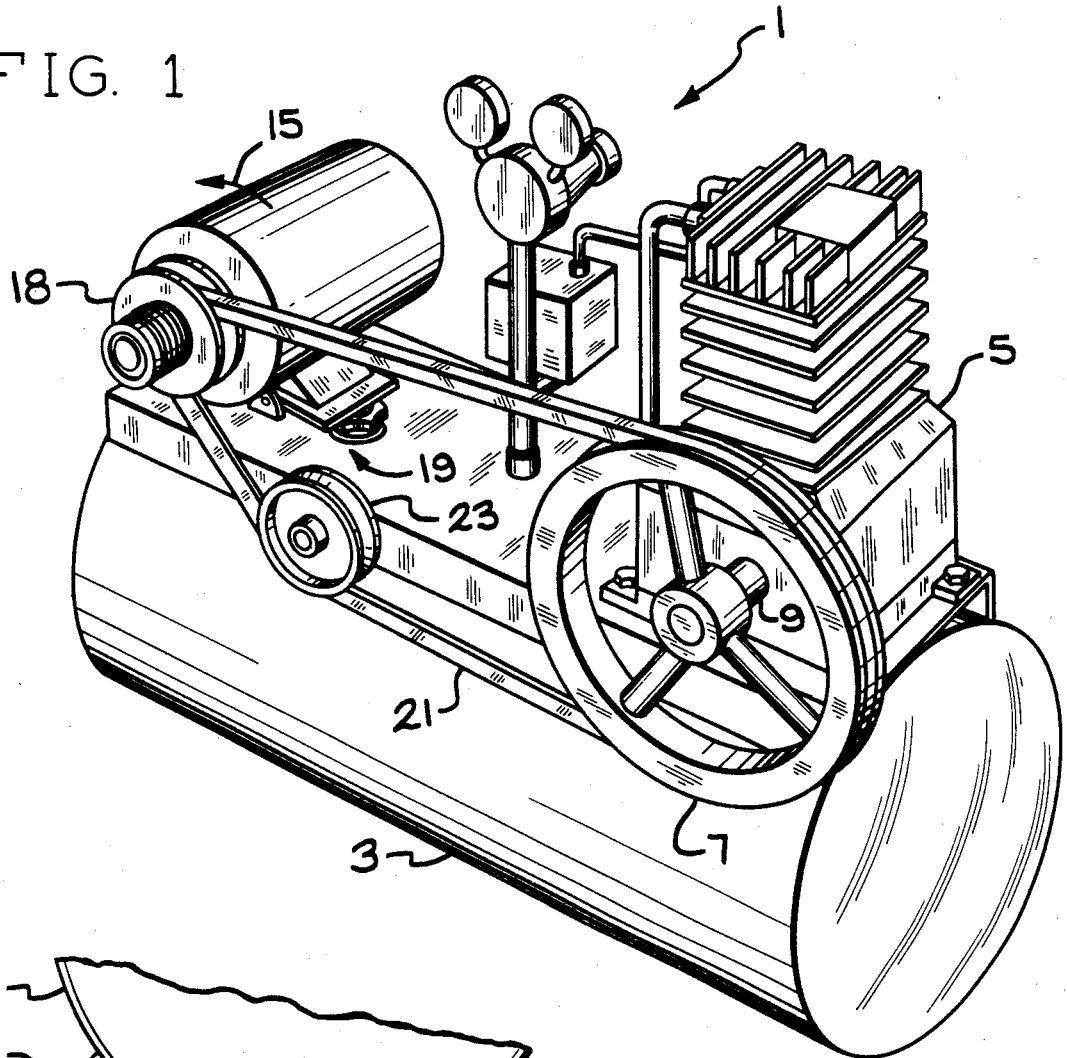
FIG. 1 is a perspective view of an improved air compressor in accordance with the present invention.

FIG. 1 shows one embodiment of the air compressor of this invention. The air compressor 1 contains an air reservoir 3 in which compressed air is stored. Mounted on the air reservoir 3 is a compressor 5 and there is a pulley 7 positioned on the shaft 9 of the compressor. A constant speed electrical motor 15 is also positioned on the air reservoir 3. A variable drive means in the form of a variable pitch pulley 18 is positioned on the output shaft of the motor. The variable pitch pulley 18 is shown in more detail in FIG. 3. The motor 15 is mounted on a pivotable base 19. A continuous drive belt 21 passes around the pulley 7 and the variable pitch pulley 18 to operatively connect the motor 15 and the air compressor 5. An idler pulley 23 can be positioned at a point along the path of the drive belt 21 to insure that the drive belt is properly tensioned.

Figure 2:
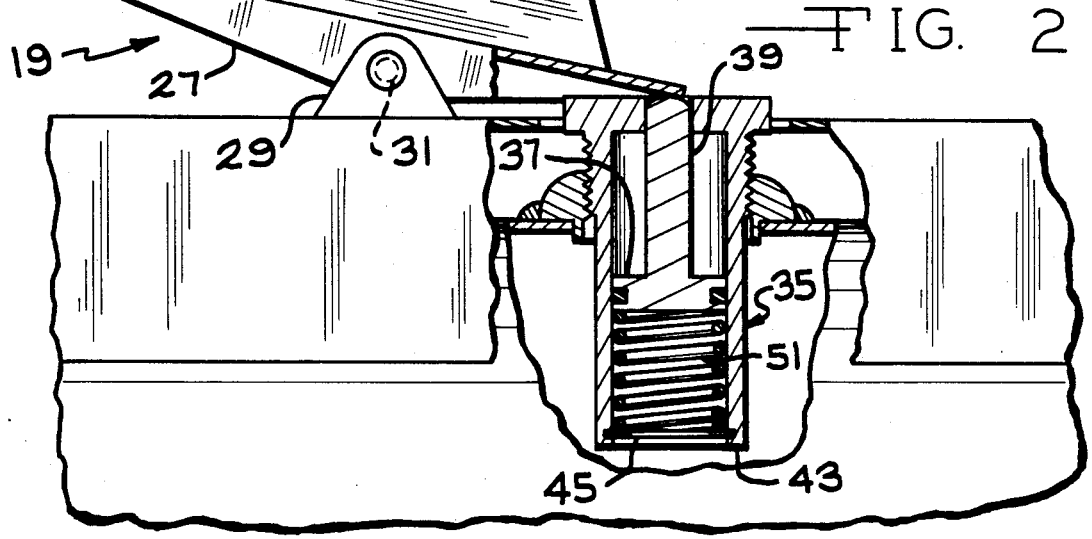
FIG. 2 is a partial front elevation view with a cross sectional view of a portion of the air compressor.

FIG. 2 shows additional detail of the pivotal base 19 that is used to support the motor 15. The base 26 of the motor 15 is mounted on member 27. The member 27 is pivotally connected to support 29 by means of a pin 31 or other suitable securement means. The member 27 is mounted on the support 29 so that the member is free to pivot about the longitudinal axis of the pin 31.

An air cylinder 35 is positioned in the air reservior. The air cylinder contains a piston 37 having a shaft 39 connected to the piston. One end of the shaft 39 projects through an aperture in the air reservoir and contacts the member 27. The end 43 of the air cylinder is open to the air reservoir. A spring 51 is positioned in the air cylinder between the piston 37 and a snap ring 45. The spring acts to bias the piston 37 and shaft 39 towards the member 27. Suitable seals can be provided on the piston 37 and around the shaft 39 to prevent or reduce the leakage of air from the air cylinder 35.

Figure 3:
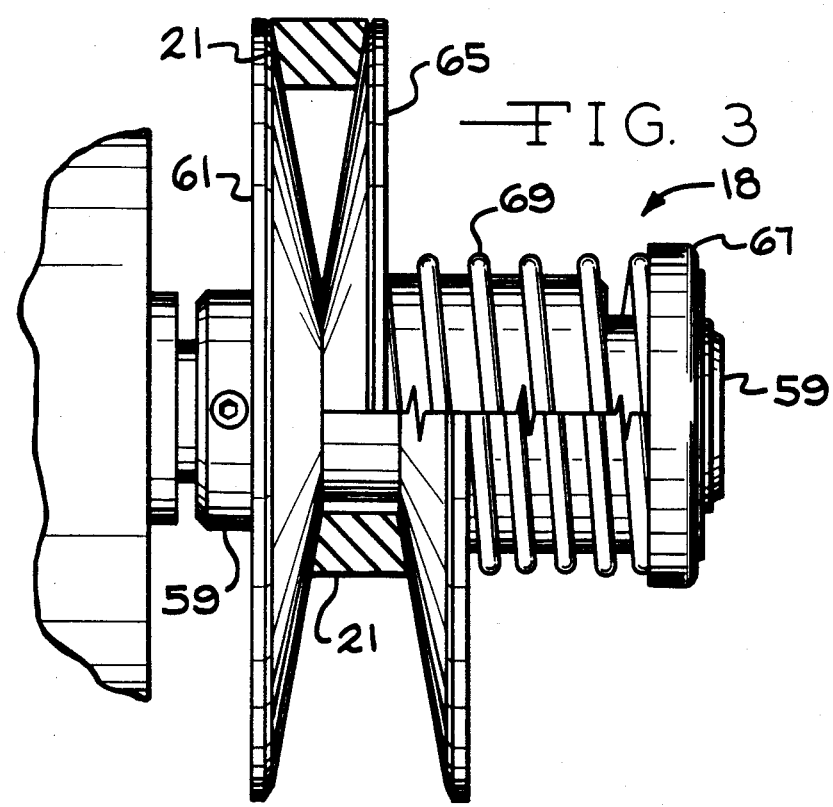
FIG. 3 is a cross sectional view of one feature of the air compressor.

FIG. 3 shows additional details of the variable pitch pulley 18 which can be used as the variable drive means associated with this invention. The variable pitch pulley 18 is mounted upon the drive shaft for the motor 15. The variable pitch pulley 18 contains a center shaft 59 that is securable to the drive shaft of the motor. The first side wall 61 of the pulley is securely attached to the shaft 59. The second side wall 65 of the pulley is slideably mounted upon the shaft 59. A cap 67 is positioned on the end of the shaft 59 that is spaced apart from the motor 15. A spring 69 extends between the second side wall 65 of the pulley and the cap 67. The spring 69 acts to bias the second side wall 65 towards the first side wall 61. Although a variable pitch pulley 18 has been shown as the variable drive means that is associated with the motor 15, it should be understood that other variable drive means can be used in the present invention.

The operation of the present invention will best be understood by referring to FIGS. 1,2 and 3 in connection with the following description. The constant speed motor 15 is energized which causes the drive shaft of the motor to rotate at a constant speed. The rotation of the drive shaft of the motor 15 will cause the variable pitch pulley 18 to rotate and the drive belt 21 to advance. As the drive belt 21 operatively connects the variable pitch pulley 18 with the pulley 7 on the compressor 5, the compressor 5 will be engaged or caused to rotate by the advancement of the belt 21. Rotation of the compressor 5 will cause air under pressure to be directed into the air reservoir 3. An idler pulley 23 can be positioned along the path of the drive belt 21 to insure that there is proper tension on the drive belt 21.

The motor 15 is designed to operate at a constant speed over the operating range for the air compressor. The motor also has a maximum amperage rating at which the motor can be operated. The motor 15 produces its greatest output at this maximum amperage rating. Accordingly, it is desirable to have the motor operate at this maximum amperage level over the entire operational spectrum of the air compressor to continuously derive the maximum output from the motor 15.

To keep the motor 15 operating at its maximum capacity a variable pitch pulley 18 and a pivotal base 19 have been connected to the motor 15. Details of a variable pitch pulley 18, which is suitable for use with this invention, are shown in FIG. 3. The pivotal base 19 is used in connection with the variable pitch pulley to alter the position of the motor 15 with respect to the compressor 5 and to alter the drive ratio between the motor and the compressor. By altering the drive ratio between the motor and the compressor the speed at which the compressor rotates can be varied.

The air cylinder 35 is used to control the position of the motor 15. When the motor 15 is initially started and there is little or no built up pressure in the air reservoir 3 the motor 15 will be biased towards the compressor 5 by the tension on the drive belt 21. The tension on the drive belt 21 will be created by the variable pitch pulley 18. The spring 69 on the pulley 18 biases the second side wall 65 of the pulley towards the first side wall 61 of the pulley. The biasing of the second side wall 65 reduces the v-shaped opening formed between the two side walls of the pulley and forces the drive belt further from the center of the variable pitch pulley. The tension on the drive belt 21 causes the member 27 to pivot on the support 29 so that the motor 15 is positioned closer to the compressor 5.

When the drive belt 21 is displaced from the center of the variable pitch pulley 18 by the spring 69 the drive ratio between the pulley on the motor 15 and the pulley on the compressor 5 will change. As the drive belt 21 moves further from the center of the pulley 18 the drive belt 21 will be advanced further by each rotation of the pulley 18 and the speed at which the belt is traveling will increase. As shown in the upper half of FIG. 3 the drive belt 21 is displaced the maximum distance from the center of the variable pitch pulley 18. In this position each rotation of the motor 15 and the pulley 18 will cause the drive belt 21 to be advanced the maximum distance. Thus, the drive belt will be advancing at its maximum speed. Accordingly, when the drive belt is in the position shown in the upper portion of FIG. 3 the drive belt 21 will cause the compressor to operate at the fastest speed.

As the air pressure in the air reservoir 3 increases the load on the compressor increases and the compressor 5 will have to work harder to supply additional compressed air to the reservoir. As the load on the compressor 5 increases the speed at which the compressor is operating must be reduced to avoid overloading the motor 15.

The pivotal base 13, air cylinder 35 and variable pitch pulley 18 are utilized to vary the operating speed of the compressor 5 and the motor 15. The end 43 of the air cylinder 35 is open to the air reservoir 3. The pressure of the air in the reservoir acts directly on the piston 37 of the air cylinder. As the pressure of the air in the reservoir 3 increases the force on the piston 37 will increase. The force of the air pressure on the piston acts to cause the piston and shaft to move towards the motor 15. The spring 51 in the air cylinder 35 is also positioned to supply a force that biases the piston 37 and shaft 39 towards the motor. As the shaft 39 moves toward the motor 15 it acts against the member 27 and causes the member 27 to pivot on support, 29. The pivoting of the member 27 caused by the shaft 39 moves the motor 15 away from the compressor 5. As the motor 15 moves away from the compressor 5 the tension on the drive belt 21 will be increased. As the tension on the drive belt 21 increases the force on the second side wall 65 of the pulley will become greater than the biasing force of the spring 69. Thus, the second side wall 65 will slide along the shaft 59 of the variable pitch pulley 18 towards the cap 67. The second side wall 65 will continue to slide on the shaft 59 until the motor 15 stops moving away from the compressor 5. The motor will stop moving away from the compressor when the biasing force of the spring 69 equals the force on the piston 37 from the air pressure in the reservoir 3 and the biasing force on the piston from the spring 51.

The movement of the second side wall 65 will expand the v-shaped section that is formed between the first and second side walls of the pulley. The tension on the belt 21 will cause the belt to move towards the center of the pulley 18 into the expanded v-shaped section formed between the first and second side walls. As the drive belt 21 moves closer to the center of the variable pitch pulley 18 the drive ratio between the variable pitch pulley 18 and the pulley 7 on the compressor 5 will change. Each rotation of the variable pitch pulley 18 will not advance the drive belt as far as the drive belt moves towards the center of the pulley 18. Thus, as the belt 21 moves towards the center of the pulley 18 the belt will advanced at a slower speed and the compressor 5 will be caused to rotate at a slower speed. The lower portion of FIG. 3 shows the second side wall 65 displaced towards the end cap 67 to such an extent that the drive belt 21 is adjacent the center section of the pulley. In this position the drive belt 21 will cause the compressor to operate at the slowest speed.

As the pressure in the air reservoir 3 increases the piston 37 and shaft 39 will continue to move toward the motor 15.

The air cylinder 35, pivotal base 19 and variable pitch pulley 18 are constructed so that they cooperate to insure that the compressor 5 is receiving as close as possible the maximum driving force from the motor 15 during the operation of the air compressor. When the air reservoir 3 is at a low pressure the compressor 5 can be operated at a higher speed so that larger quantities of low pressure air are delivered to the reservoir. As the pressure in the reservoir increases the speed of the compressor 5 will be reduced and smaller quantities of higher pressure air are delivered to the reservoir 3. The speed of the compressor 15 is directly proportional to the air pressure in the air reservoir. As the air pressure increases the compressor will have to operate at a lower speed to avoid over loading the motor. If the pressure in the reservoir decreases the compressor can be operated at a faster speed to compensate for the lower pressure. Although the speed of the compressor 5 will vary the motor 15 will always operate at a constant speed and the load on the motor will always be at or near the maximum load rating for the motor.

The biasing force of the spring 69, biasing force of spring 51 and the cross sectional area of the piston 37 can be selected to require that a preselected air pressure be established in the resèrvoir 3 before the piston and shaft begin to move towards the motor. Thus, a preselected pressure will have to be reached before the speed of the compressor is reduced. This mode of operation will insure that the compressor will supply the largest quantity of low pressure air to the reservoir. However, the preselected air pressure cannot be set at a point that will cause the motor to become overloaded before the motor moves away from the compressor and reduces the speed at which the compressor is rotating.

Figure 4:
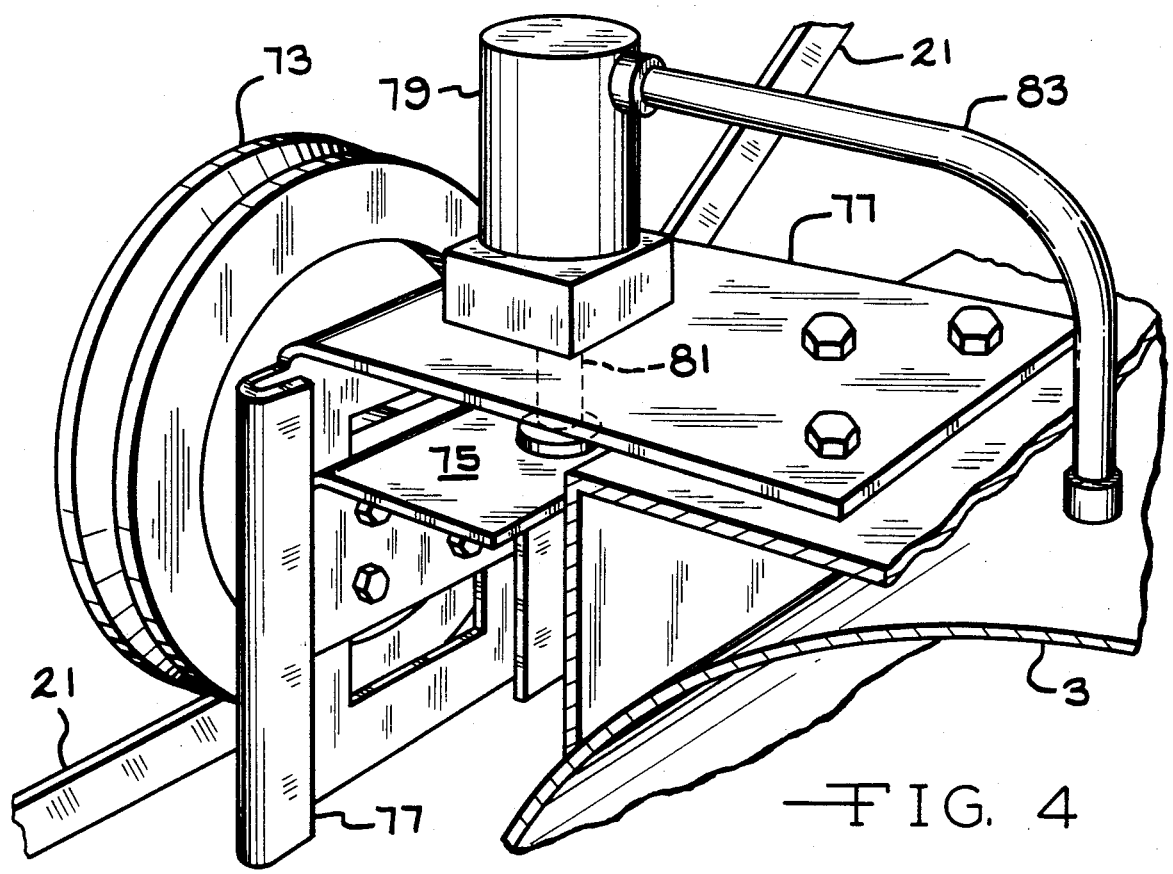
FIG. 4 is a perspective view of another embodiment of an air compressor of this invention.

FIG. 4 shows another embodiment of the air compressor invention. In this embodiment an idler pulley 73 is positioned so that the drive belt 21 engages the idler pulley. The idler pulley is mounted on a bracket 72 and the idler pulley 73 and bracket 75 are slideably mounted on a frame 77. An air cylinder 79 containing a shaft 81 and a piston (not shown), similar to the piston and shaft shown for the, previously described air clyinder 35, is mounted on the frame 77. The shaft 81 of the air clyinder 72 engages the bracket 75 which is slideably mounted in the frame 77. A conduit 83 connects the air reservoir 3 with the air clyinder 79.

In operation the embodiment shown in FIG. 4 will operate essentially as the previously described pivotal base 19 and air cylinder 35 to vary the position of the drive belt 21 in the variable pitch pulley 18 on the motor 15. The pressure in the air reservoir 3 is supplied to the air cylinder 79 through conduit 83. An increase in the air pressure in the reservoir will cause the piston in the air cylinder 79 to move towards the bracket 75. The movement of the piston will cause the shaft 81 to also move towards the bracket 75. The motion of the shaft 81 will cause the bracket 75 and the idler pulley 73 to move in a direction towards the drive belt 21. Thus, as the air pressure in the air reservoir 3 increases the shaft 81 will cause the bracket 75 and idler pulley 73 to move in a direction that will increase the tension on the drive belt 21. The increased tension on the drive belt 21 will cause the second side wall 65 of the variable pitch pulley 18 to slide on the shaft 59 of the variable pitch pulley. As the second side wall 65 moves along the shaft 59 the drive belt 21 will move into the increased width of the slot, formed between the first side wall 61 and the second side wall 65, towards the center region of the pulley 18. As previously explained, when the drive belt moves to a different position in the variable pitch pulley 18 the speed of the belt will vary. As the speed of the belt 21 varies the speed at which the compressor 5 is rotating will also vary. Thus, the speed of the compressor will be caused to vary with the air pressure in the air reservoir 3.

The idler pulley 73, air cylinder 79, and variable pitch pulley 18 of this embodiment are constructed so that the compressor 5 will be operating at a speed, throughout the operational range of the air compressor, that keeps the motor 15 operating at or near the maximum capacity for the motor.

Figure 5:
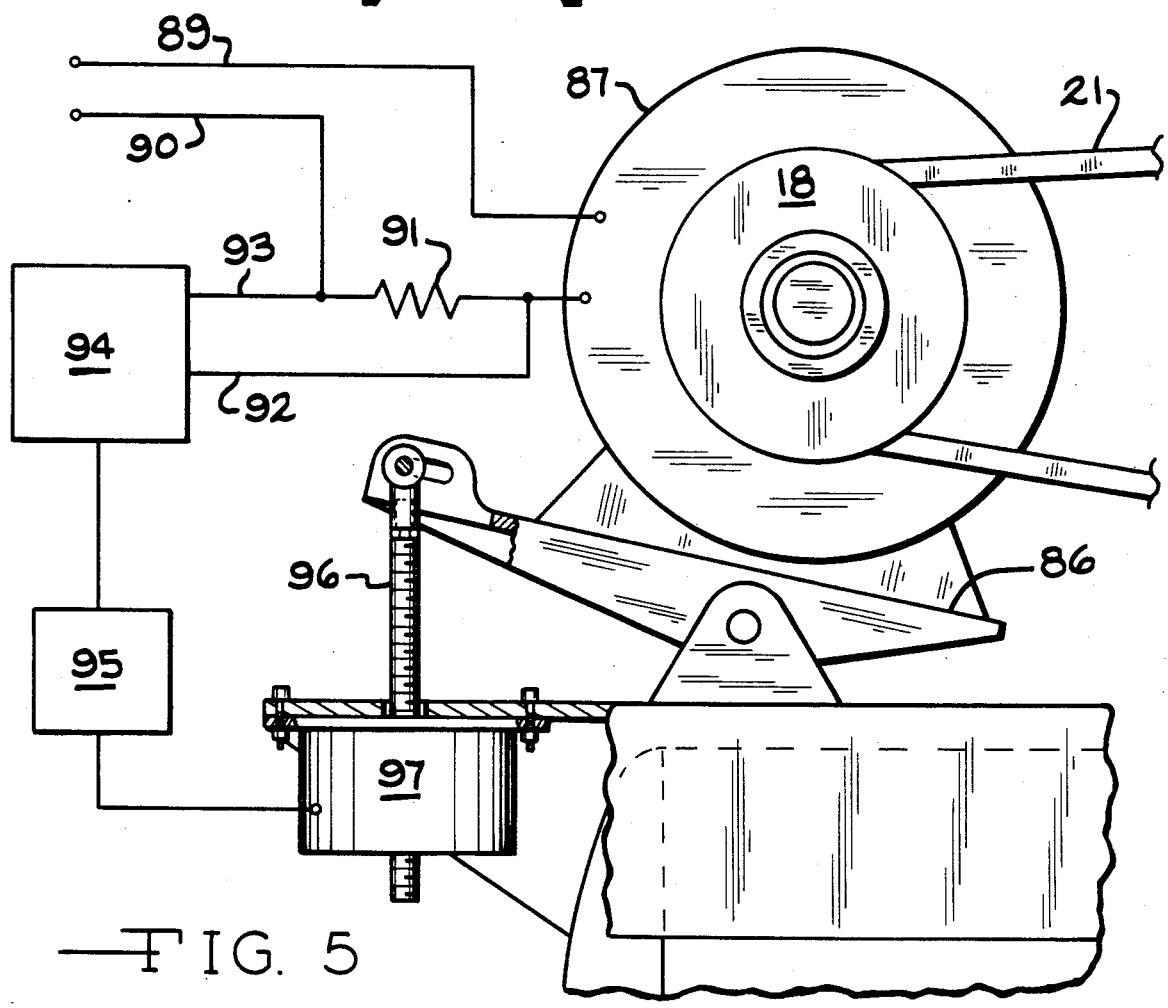
FIG. 5 is a side elevation view of another embodiment of an air compressor of this invention.

FIG. 5 shows another embodiment of the present invention. In this embodiment a drive motor 87 is supported on a pivotal base 86. A variable pitch pully 18 is mounted on the output shaft of the motor 87. A drive belt 21 operatively engages the variable pitch pulley 18. The drive belt 21 operatively connects the motor 87 to a suitable compressor or load means (not shown). Power is supplied to the constant speed motor 87 by a power line having a first conductor 89 and a second conductor 90. A resistor 91 is positioned in the second conductor 90 adjacent to the motor 87. A first electrical connector 92 is connected to the second conductor 90 between the resistor 91 and the motor 97. A second electrical connector 93 connects to the second conductor 90 on the other side of the resistor 91. The first and second electrical connectors are connected to a rectifier 94. The rectifier 94 is electrically connected to a solid state control chip 95. An example of a suitable control chip is an AIRPAX SAA 1-27 Driver. The resistor 91, rectifier 94 and control chip 95 provide a means for sensing the operating condition of the motor. The control chip 95 is electrically connected to a stepper motor driven linear actuator 97. The linear actuator has a threaded member 96 that is connected to the pivotal base 86 for the motor 87. An example of a suitable stepper motor driven linear actuator is an AIRPAX Series 92400 linear actuator.

In operation the first conductor 89 and second conductor 90 supply power to the motor 87 for operating the motor and driving the compressor (not shown). There is a voltage drop across the resistor 91 which is proportional to the current which is passing through the resisitor. The voltage drop across the resistor 91 will be transmitted to the rectifier 94 through first electrical connector 92 and second electrical connector 93. The rectifier 94 converts the voltage drop across the resistor 91 to a D.C. signal. The D.C. signal will be transmitted from the rectifier to the control chip 95. The control chip analyzes the signal to determine the load on the motor 87. If the load on the motor is not at the level to provide optimum performance of the air compressor, the control chip will send a signal to activate the linear actuator. The signal from the control chip will cause the stepper motor to rotate which in turn will rotate the threaded shaft 96 of the linear actuator. Rotation of the threaded shaft will cause the shaft to be displaced in a direction that is parallel to the longitudinal axis of the shaft. The shaft will move in a direction that is generally either toward or away from the motor 87 depending on the direction of rotation of the shaft. Since the shaft 96 is connected to the pivotal member 86 the member and the motor 87 will move in response to movement of the threaded shaft 96. Thus, the control chip 95 can activate the linear actuator to change the position of the motor 87 with respect to the compressor to vary the loading on the motor.

By changing the position of the motor 87 with respect to the compressor, the drive belt and variable pitch pulley will cooperate to vary the drive ratio between the motor and the compressor. As the drive ratio changes the loading on the motor 87 will also change. The variable pitch pulley 18 and drive belt 21 cooperate to vary the loading on the compressor in response to the movement of the motor in the manner that has previously been described.

The control chip 95 is normally constructed so that when maximum rated loading for the motor 87 is reached the control chip will send a signal to the linear actuator 97 to advance the threaded shaft 96 so that the motor 87 will pivot away from the compressor. As the motor pivots away from the compressor, the loading on the motor will be reduced and the maximum rated loading for the motor will not be exceeded. There will also be a low point on the loading range for the motor 87 and when this low point is reached the control chip will send a signal to the linear actuator 97 to rotate the threaded shaft 96 so that the motor 87 moves towards the compressor. As the motor moves towards the compressor the loading on the motor will increase and the motor will be kept operating in a range where substantially the maximum amount of work is received from the motor. In between the high and low load values established in the control chip 95 for the motor, the control chip 95 will not send a signal to the linear actuator and the position of the motor with respect the compressor will not be changed. Accordingly, the load on the motor will also not be changed. Normally the acceptable load range in which the motor will be allowed to operate will be very small. For example, if the maximum rated load for the motor is set at 20 amps. the control chip 95 would send a signal to the linear actuator 97 to reduce the loading on the motor when this maximum loading is obtained. The minimum loading point established in the control chip for this example could be set at 19 amps. When the load on the motor fell to 19 amps. the control chip 95 would send a signal to the linear actuator 97 to increase the loading on the motor. When the motor was operating at a load level between 19 and 20 amps., the control chip 95 would not send a signal to the linear actuator 97 and the load on the motor would not be changed. Thus, in this example, the control mechanism in this embodiment would operate to cause the motor 87 to operate in a very narrow load range. This narrow load range is also very close to the maximum rated loading for the motor. Accordingly, the motor would be caused to operate at a level close to the maximum rated load for the motor and substantially the maximum output of the motor would be utilized over the entire operational range for the air compressor.

Figure 6:
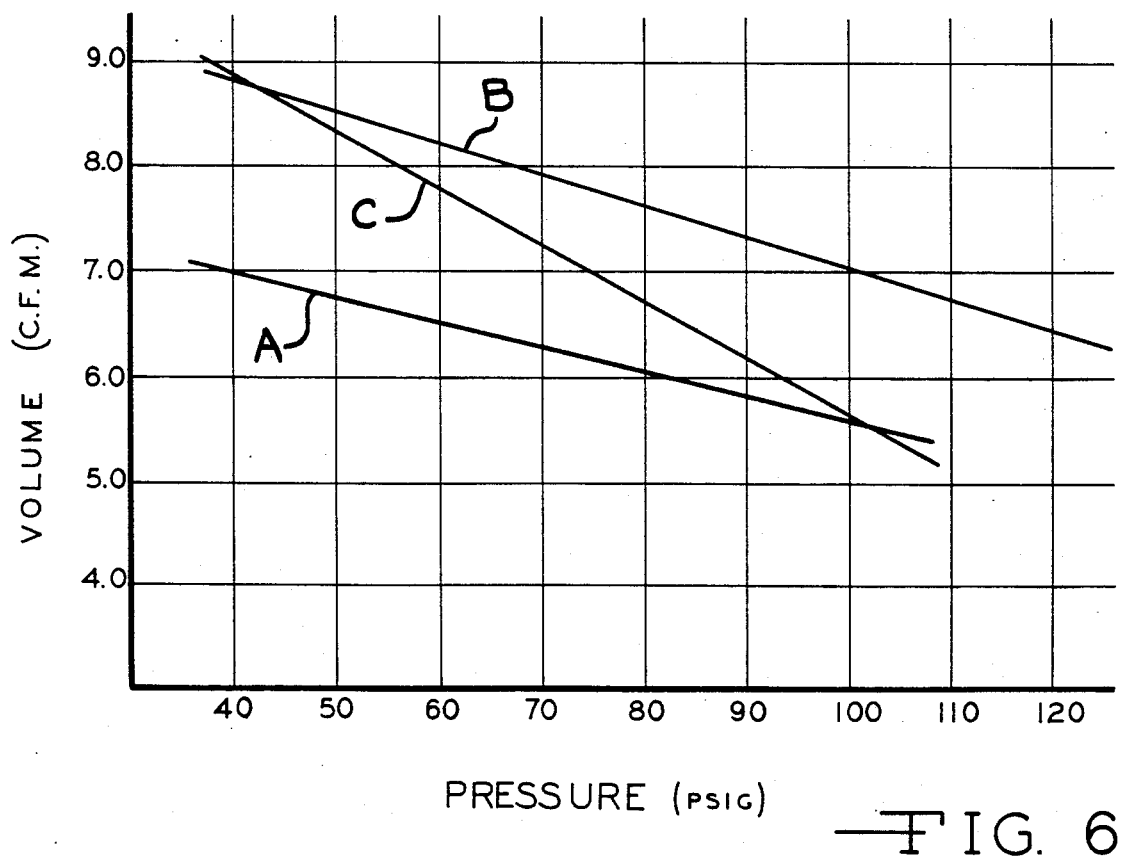
FIG. 6 is a graph comparing the performance of an air compressor utilizing the present invention and traditional air compressors.

FIG. 6 is a graph which demonstrates the improved performance that can be expected by utilizing the present invention on an air compressor. The abscissa of the graph represents the pressure of the air in pounds per square inch gauge that is produced by the compressor. The ordinant of the graph represents the volumetric output of the compressor in cubic feet per minute.

Line A is a graph of the performance of a traditional air compressor having a one horse power electrical motor. Line B is a graph of the performance of a traditional air compressor having a two horse power electrical motor. Line C represents a graph of the performance of an air compressor having a one horse power electrical motor and utilizing the present invention.

As can be seen from FIG. 6, in the lower pressure range for the air compressors, the compressor having a one horse power motor utilizing the present invention has a performance that is substantially the same as a traditional compressor having a two horse power motor. At 40 pounds pressure the compressor of this invention produces approximately 1¾ cubic feet per minute more volumetric outputs than the traditional compressor having a one horse power motor.

The performance of the one horse power compressor utilizing the present invention is superior to the performance of the traditional one horse power compressor over substantially the entire operating range for the compressors. At the maximum rated output for the compressors the performance of the one horse power compressor utilizing the present invention is substantially the same as the performance for the traditional one horse power compressor. Thus, as can be seen in FIG. 6 the present invention substantially improves the performance of an air compressor over a substantial portion of the operating range for the compressor. It should be noted that this increase in performance is accomplished without increasing the horse power rating for the motor that drives the compressor.

Having described the invention in detail with reference to the drawings, it will be understood that such specifications are given for the sake of explanation. Various modifications and substitutions other than those cited can be made without departing from the spirit and scope of the invention as defined by the following claims.

What I claim is:

1. Air compressor apparatus comprising:
   a constant speed electrical motor, said motor being mounted on a pivotal base;
   a variable pitch pulley positioned on the output shaft of said motor;
   a compressor positioned in adjacent and spaced apart relationship with said motor;
   a drive belt positioned around said variable pitch pulley and extending to said compressor, said belt operatively connecting said motor to said compressor;
   an air receiving container for receiving air from said compressor; and
   an air cylinder projecting into said air receiving container, said air cylinder having a movable piston and shaft, one end of said shaft extending from said container and being connected to said pivotal base for said motor, said piston and shaft of said air cylinder moving in response to varying pressure in said air receiving container whereby the movement of said piston causes said pivotal base and said motor to move with respect to said compressor, the movement of said motor causing said drive belt to change position in said variable pitch pulley and changing the drive ratio between said motor and said compressor to vary the load on said motor, said motor being moved on said pivotal base to keep said motor operating near the maximum rated load for said motor over the operational range for said air compressor.

2. Method of varying the load on the motor of an air compressor comprising the steps of:
   driving a compressor with a constant speed motor, a variable pitch pulley being mounted on the output shaft of said motor and a drive belt positioned on said variable pitch pulley and extending to said compressor, said drive belt operatively connecting said compressor to said constant speed motor, said motor being capable of driving said compressor to supply air under pressure to an air receiving container, said motor being movably mounted with respect to said compressor, said motor being mounted on a pivotal base;
   sensing the pressure in said air receiving container with an air cylinder projecting into said air receiving container, said air cylinder containing a piston and a shaft that are movable in response to changes in the air pressure in said air receiving container, one end of said shaft extending from said container and being connected to said movably mounted motor; and
   moving said motor with respect to said compressor in response to changes in air pressure in said container through the movement of said piston and shaft of said air cylinder, said drive belt changing position in said variable pitch pulley as said motor pivots on said pivotal base to vary the drive ratio between said motor and said compressor, said motor being moved on said pivotal base to keep said motor operating near the maximum rated load for said motor over the operational range for said air compressor.

* * * * *